B. URQUHART.
DRAFT ATTACHMENT FOR AUTOMOBILES.
APPLICATION FILED NOV. 7, 1910.
1,076,799.
Patented Oct. 28, 1913.
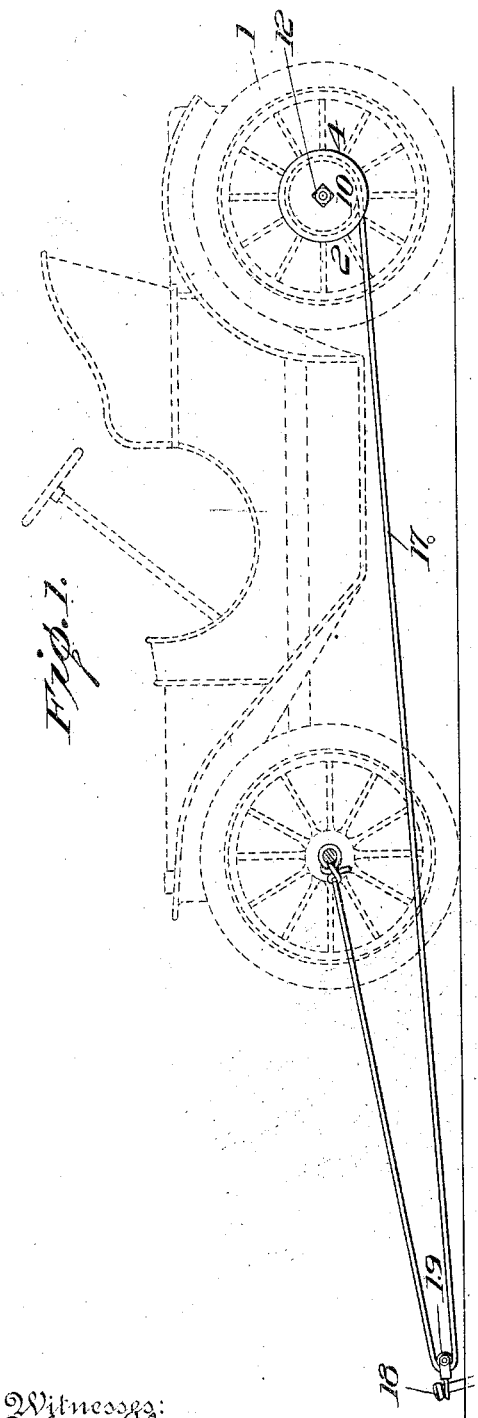
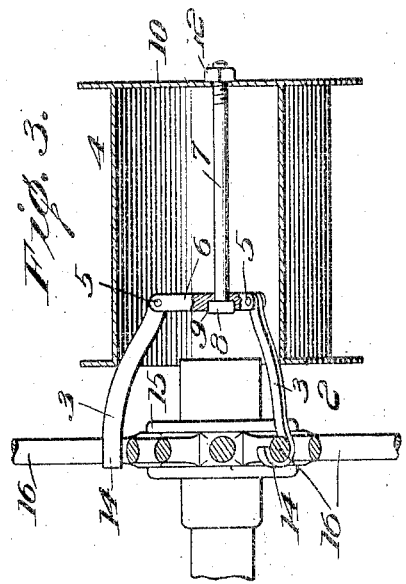
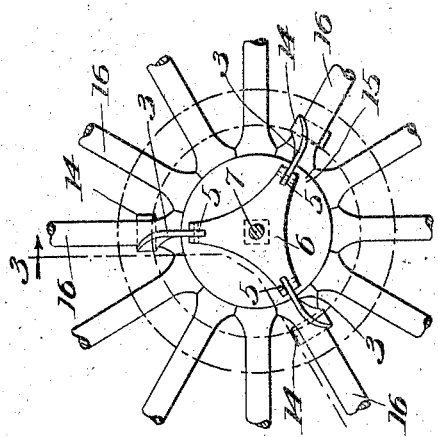

UNITED STATES PATENT OFFICE.

BENJAMIN URQUHART, OF PLAINFIELD, NEW JERSEY.

DRAFT ATTACHMENT FOR AUTOMOBILES.

1,076,799.  Specification of Letters Patent.  Patented Oct. 28, 1913.

Application filed November 7, 1910. Serial No. 591,161.

*To all whom it may concern:*

Be it known that I, BENJAMIN URQUHART, of Plainfield, in the county of Union and State of New Jersey, have invented certain new and useful Improvements in Draft Attachments for Automobiles; and I do hereby declare the following to be a full, clear, and exact description of the invention, such as will enable others skilled in the art to which it appertains to make and use the same.

This invention contemplates an improved draft attachment for automobiles adapted for gaining traction when the wheels of the machine have become "stalled" or embedded in muddy ruts.

Devices having substantially the same object in view have heretofore been devised, but so far as I am aware, they have all contemplated expensive attaching devices, which, in addition to being complicated in construction, have been designed for engaging the rim of the traction wheel. When this wheel is embedded in a roadway it is usually impossible to reach the rim of the wheel for the purpose of attaching the device.

The primary object of my invention is to provide simple and effective mechanism which may be cheaply manufactured and readily carried on the running board of the machine and which is secured to a traction wheel at its hub.

In the accompanying drawing, Figure 1 shows an automobile and the manner of attaching the draft appliance. Fig. 2 is an elevation, and Fig. 3 is a longitudinal section on line 3—3, Fig. 2.

Referring to the drawing 1 designates portion of a traction wheel of an automobile and 2 the draft attachment as an entirety. This attachment comprises the wheel engaging member having a plurality of arms 3 for engagement with the traction wheel and a drum 4 inclosing the arms for a portion of their length and movable longitudinally thereof. I have shown the arms pivoted as at 5 to a spider 6 having a central opening to receive a bolt 7 formed with a square head 8. The surface surrounding the opening may be formed with a recess as indicated at 9 to receive the head 8 and prevent the bolt from turning. The hollow drum 4 is closed at its outer end by a head 10 through which the bolt 7 passes. By means of a nut 12, tapped on the bolt, the drum may be moved inward upon the arms, the nut bearing against the head of the drum, and upon loosening this nut the drum may be moved outward from the arms by hand.

I have shown the arms 3 curved outward longitudinally so that when the parts are assembled these curved portions of the arms collectively constitute a cam surface to receive the drum. Owing to the pivotal connections between the arms and the spider 6, the former may be brought together or spread apart to any desired extent, and I have shown each of the arms formed with an abrupt curve at its free end to form a hook 14.

It will be noted that when the device is attached to a traction wheel the arms 3 are clustered around the hub and engage the inner ends of their respective spokes. The positive engagement thus provided is very effective and will stand considerable strain.

When the arms have been placed in position upon the traction wheel, as described, the drum 4 is slipped over the arms and the nut 12 turned to move the drum inward. This movement causes the drum to pass over the curved surface of the arms, effectively binding the drum and arms together by frictional contact and also causing the hooked ends of the arms to bear against the inner ends of the spokes.

With the parts thus assembled, a rope or cable 17 may be wound upon the drum and secured to a stake 18 driven into the ground in advance of the vehicle, after which starting the motor and the rotation of the traction wheel will cause the rotation of the wheel to pull against a stationary object and tend to pull the machine from the rut.

As indicated in Fig. 1, I preferably attach a pulley 19 to the stake 18 and pass the cable 17 over this pulley and secure it to the front axle of the car. This results in the pull being exerted directly upon the front of the car and insures forward movement, whereas if only the traction device were connected to the stake, the pull would tend to move the machine sidewise.

I claim as my invention:—

1. In a draft attachment for automobile traction wheels, a plurality of arms adapted to engage the inner ends of the spokes of the wheel and extend outward therefrom, at substantially right angles to the plane of the wheel, and a drum movable longitudinally on said arms.

2. In a draft attachment for automobile traction wheels, a plurality of arms formed to constitute a cam surface and having extremities adapted to engage the inner ends of the spokes of the wheel, a drum mounted on said arms, and means for moving said drum on said arms to bind it thereto by frictional engagement with said cam surface.

3. In a draft attachment for automobile traction wheels, a drum, a spider within said drum, a plurality of arms pivotally mounted on said spider, said arms being each curved outward longitudinally and formed with a hooked extremity adapted to engage the spokes of the wheel whereby said arms collectively surround the hub, and means for moving said drum longitudinally over said arms to clamp it thereon.

4. In a draft attachment for automobile traction wheels, a drum closed at its outer end, a spider within said drum, a threaded bolt connecting said drum and spider, and having a nut bearing against the end of said drum, and a plurality of arms pivotally mounted on said spider.

5. A draft attachment for automobile traction wheels comprising a drum, a bolt extending longitudinally through said drum, means for connecting said bolt with a traction wheel at its hub, and means for binding said drum by moving it longitudinally over said bolt and connecting means.

6. A draft attachment for automobile traction wheels comprising a drum closed at its outer head or end, a spider within said drum, a threaded bolt extending from said spider through the outer closed head of said drum and having a nut on its outer end bearing against the head of said drum, and means for connecting said spider with the inner ends of the spokes of a traction wheel.

In testimony whereof, I have signed this specification in the presence of two subscribing witnesses.

BENJAMIN URQUHART.

Witnesses:
CLARENCE BROUARD,
ASA F. RANDOLPH.